United States Patent
Easo Varghese

(10) Patent No.: US 12,381,501 B2
(45) Date of Patent: Aug. 5, 2025

(54) USB-PD INTEGRATED CIRCUIT CONTROLLER AND SYSTEM FOR POWERING A DYNAMIC LOAD OVER A USB TYPE-C CABLE

(71) Applicant: Cypress Semiconductor Corporation, San Jose, CA (US)

(72) Inventor: Blesson Easo Varghese, Dakshina Kannada (IN)

(73) Assignee: CYPRESS SEMICONDUCTOR CORPORATION, San Jose, CA (US)

(*) Notice: Subject to any disclaimer, the term of this patent is extended or adjusted under 35 U.S.C. 154(b) by 157 days.

(21) Appl. No.: 18/460,120

(22) Filed: Sep. 1, 2023

(65) Prior Publication Data
US 2025/0080022 A1    Mar. 6, 2025

(51) Int. Cl.
H02P 23/00    (2016.01)
H02P 25/03    (2016.01)

(52) U.S. Cl.
CPC .............. *H02P 23/00* (2013.01); *H02P 25/03* (2016.02)

(58) Field of Classification Search
CPC .............. H02P 23/00; H02P 25/03; H02P 6/08
USPC ................................................. 318/494, 503
See application file for complete search history.

(56) References Cited

U.S. PATENT DOCUMENTS 10,797,687 B2 * 10/2020 Wang ................... H03K 5/1565

OTHER PUBLICATIONS

"USB PD sensorless brushless DC (BLDC) motor controller using EZ-PD™ PMG1-S3 MCU", Infineon—AN237305, 002-37305 Rev., Mar. 29, 2023, pp. 1-58.
Varghese, Blesson Easo, "USB-C PD-powered motor control solutions", Infineon, v1.0, May 2023, pp. 1-15.
Varghese, Blesson Easo, "USB-C PD-powered motor control solutions", Infineon, Edition: v1.0, Whitepaper, May 2023, pp. 1-13.

* cited by examiner

*Primary Examiner* — David Luo
(74) *Attorney, Agent, or Firm* — Murphy, Bilak & Homiller, PLLC

(57) ABSTRACT

A Universal Serial Bus (USB)-Power Delivery (PD) integrated circuit (IC) controller includes: a first control loop configured to calculate a duty cycle based on a difference between a measured operating parameter of a dynamic load and a reference operating parameter; and a second control loop configured to calculate a duty cycle adjustment value that ensures a maximum supported current to be delivered over a USB Type-C cable to the dynamic load is not exceeded during operation of the dynamic load. The USB-PD IC controller is configured to adjust the duty cycle based on the duty cycle adjustment value, and to power the dynamic load over the USB Type-C cable with a DC voltage having a magnitude that corresponds to the adjusted duty cycle. An electronic system that includes the dynamic load and the USB-PD IC controller is also described.

20 Claims, 8 Drawing Sheets

USB-PD INTEGRATED CIRCUIT CONTROLLER AND SYSTEM FOR POWERING A DYNAMIC LOAD OVER A USB TYPE-C CABLE

BACKGROUND

Currently, sensorless BLDC (brushless DC) motors use an open-loop startup process which includes a pre-position and free-running acceleration. The startup sequence must be tuned to suit various motor specifications. Ideally, most BLDC motors consume very high current due to low-ohmic resistance. Once the rotor comes to rest after pre-alignment, a steady-state current is drawn by pure ohmic winding resistance. However, the maximum current allowed in the USB (universal serial bus) power delivery (USB PD) specification is only 5 A. Lower resistance motors may trigger an overcurrent device fault and cause system shutdown, if powered by a USB PD-based system. Dynamic loading and counter-torque also may lead to an overcurrent device fault during closed-loop operation of a BLDC motor, if powered by a USB PD-based system.

Thus, there is a need for a USB-PD integrated circuit (IC) controller that avoids overcurrent fault conditions when controlling a sensorless BLDC motor or other type of dynamic load.

SUMMARY

According to an embodiment of an electronic system, the electronic system comprises: a dynamic load; and a Universal Serial Bus (USB)-Power Delivery (PD) integrated circuit (IC) controller comprising: a first control loop configured to calculate a duty cycle based on a difference between a measured operating parameter of the dynamic load and a reference operating parameter; and a second control loop configured to calculate a duty cycle adjustment value that ensures a maximum supported current to be delivered over a USB Type-C cable to the dynamic load is not exceeded during operation of the dynamic load, wherein the USB-PD IC controller is configured to adjust the duty cycle based on the duty cycle adjustment value, and to power the dynamic load over the USB Type-C cable with a DC voltage having a magnitude that corresponds to the adjusted duty cycle.

According to an embodiment of a USB-PD IC controller, the USB-PD IC controller comprises: a first control loop configured to calculate a duty cycle based on a difference between a measured operating parameter of a dynamic load and a reference operating parameter; and a second control loop configured to calculate a duty cycle adjustment value that ensures a maximum supported current to be delivered over a USB Type-C cable to the dynamic load is not exceeded during operation of the dynamic load, wherein the USB-PD IC controller is configured to adjust the duty cycle based on the duty cycle adjustment value, and to power the dynamic load over the USB Type-C cable with a DC voltage having a magnitude that corresponds to the adjusted duty cycle.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a USB-PD IC controller that avoids overcurrent fault conditions when controlling a dynamic load such as a DC motor or other type of dynamic load that dynamically draws current from a USB-PD adapter. The USB-PD IC controller calculates a duty cycle such as a PWM (pulse width modulation) duty cycle that is used to control the dynamic load. The USB-PD IC controller adjusts the duty cycle to ensure that the maximum supported current (e.g., 5 A) to be delivered over a USB Type-C cable to the dynamic load is not exceeded during operation of the dynamic load. The USB-PD IC controller powers the dynamic load over the USB Type-C cable with a DC voltage having a magnitude that corresponds to the adjusted duty cycle, thus avoiding an overcurrent fault condition.

Described next, with reference to the figures, are exemplary embodiments of the USB-PD IC controller and an electronic system that includes the USB-PD IC controller.

Figure 1:
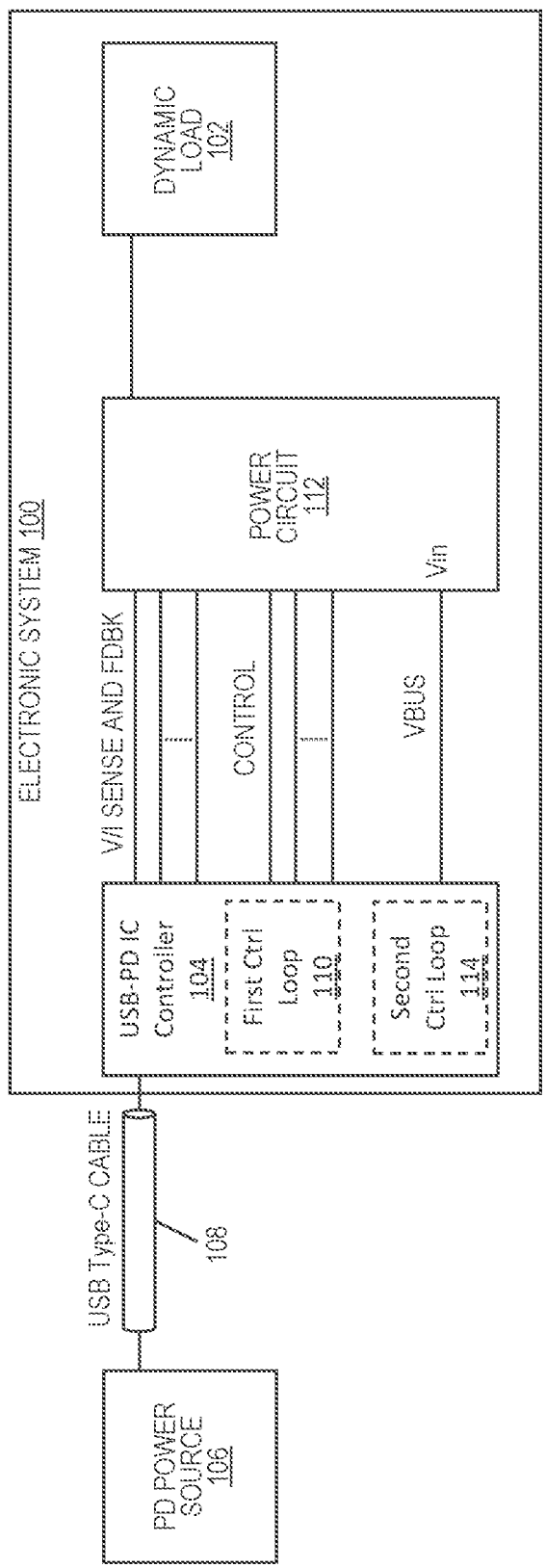
FIG. 1 illustrates a schematic diagram of an embodiment of an electronic system that includes a dynamic load and a USB-PD IC controller that controls the dynamic load.

FIG. 1 illustrates a schematic diagram of an embodiment of an electronic system 100 that includes a dynamic load 102 and a USB-PD IC controller 104 that controls the dynamic load 102. The electronic system 100 is coupled to a PD power source 106 such as a PD power adapter through a USB Type-C cable 108 which is a cable that complies with USB Type-C Specification 1.0 or higher. All USB Type-C cables must be able to carry a minimum of 3A current (at 20 V, 60 W), while some USB Type-C cables can carry a maximum supported current I_max of 5A (at 20 V, 100 W). The maximum supported current I_max described herein may be higher than 5 A as the USB Specification continues to evolve and therefore should not be limited to 5 A in this disclosure.

The load 102 is 'dynamic' in that the load 102 dynamically draws current from the PD power source 106 over the USB Type-C cable 108 during operation of the load 102, which is different than battery charging via USB-PD. The dynamic load 102 may be a DC motor such as a brushless DC (BLDC) motor, for example.

The USB-PD IC controller 104 includes a first control loop 110 to calculate a duty cycle such as a PWM (pulse width modulation) duty cycle based on a difference between a measured operating parameter of the dynamic load 102 and a reference operating parameter. Parameters such as measured current (I), measured voltage (V), back EMF (counter-electromotive force) in the case of a DC motor as the dynamic load 102, and other feedback 'Fdbk' are provided to the USB-PD IC controller 104.

The USB-PD IC controller 104 generates one or more signals 'Control' for controlling the dynamic load 102 based on the calculated duty cycle. The control signal(s) are provided to a power circuit 112. The power circuit 112 drives the dynamic load 102 based on the control signal(s) provided by the USB-PD IC controller 104. For example, in the case of a DC motor as the dynamic load 102, the power circuit 112 may include a gate driver that receives control signals from the USB-PD IC controller 104 and a power inverter coupled to each phase of the DC motor and driven by the gate driver based on the control signals.

The USB-PD IC controller 104 also includes a second control loop 114 to calculate a duty cycle adjustment value that ensures the maximum supported current I_max (e.g., 5A) to be delivered over the USB Type-C cable 108 to the dynamic load 102 is not exceeded during operation of the dynamic load 102. The USB-PD IC controller 104 adjusts the duty cycle based on the duty cycle adjustment value, and powers the dynamic load 102 over the USB Type-C cable 108 with a DC voltage Vin having a magnitude that corresponds to the adjusted duty cycle. Under USB PD Specification Revision 3.1 Version 1.8, the VBUS supply line that delivers the DC voltage Vin to the power circuit 112 can be as high as 20V in standard power range (SPR) and up to 48V in extended power range (EPR). The maximum supported VBUS voltage may change as the USB PD Specification evolves over time and therefore should not be limited to 20V or 48V in this disclosure. By powering the dynamic load 102 with a DC voltage Vin having a magnitude that corresponds to the adjusted duty cycle, an overcurrent fault condition is avoided.

Figure 2:
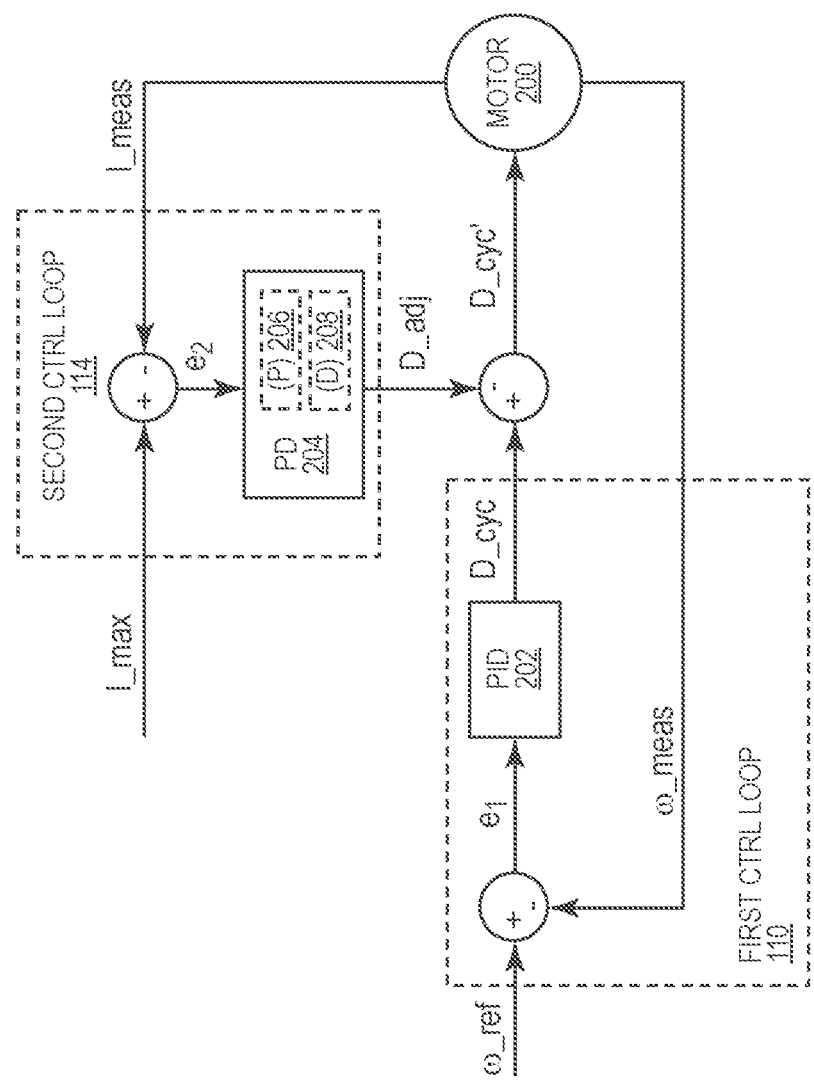
FIG. 2 illustrates a schematic diagram of an embodiment of a first control loop and a second control loop included in the USB-PD IC controller.

FIG. 2 illustrates a schematic diagram of an embodiment of the first control loop 110 and the second control loop 114 included in the USB-PD IC controller 104. The dynamic load 102 is a DC motor 200 such as a sensorless BLDC (brushless DC) motor and the USB-PD IC controller 104 controls each phase of the DC motor 200 in FIG. 2.

In FIG. 2, the measured operating parameter used to calculate the duty cycle D_cyc is measured rotor velocity ω_meas (e.g., estimated from back emf signals) of the DC motor 200 and the reference operating parameter used to calculate the duty cycle D_cyc is a reference rotor velocity ω_ref. The first control loop 110 of the USB-PD IC controller 104 calculates the duty cycle D_cyc based on the difference 'e1' between the measured rotor velocity ω_meas of the DC motor 200 and the reference rotor velocity ω_ref. For example, the first control loop 110 of the USB-PD IC controller 104 may include a proportional-integral-derivative (PID) controller 202 to calculate the duty cycle D_cyc, as shown in FIG. 2. In another embodiment, the first control loop 110 of the USB-PD IC controller 104 includes a proportional-integral (PI) controller to calculate the duty cycle D_cyc. Other types of controllers may be used to implement the first control loop 110 of the USB-PD IC controller 104.

In FIG. 2, the second control loop 114 of the USB-PD IC controller 104 calculates a duty cycle adjustment value D_adj that ensures the maximum supported current I_max to be delivered over the USB Type-C cable 108 to the DC motor 200 is not exceeded during operation of the DC motor 200. For example, the second control loop 114 of the USB-PD IC controller 104 may increase the duty cycle adjustment value D_adj as a measured current I_meas of the DC motor 200 increases and/or as a rate of change $$\frac{dI\_meas}{dt}$$

of the measured current I_meas increases. In the case of a BLDC motor as the DC motor 200, the measured current I_meas may be a measured stator phase current of the BLDC motor 200 and the maximum supported current I_max may be 5 A.

In one embodiment, the second control loop 114 of the USB-PD IC controller 104 includes an inverse proportional-derivative (PD) controller 204 to calculate the duty cycle adjustment value D_adj. The inverse PD controller 204 includes a first circuit 206 that generates a proportional term 'P' that inversely corresponds to the difference 'e2' between the measured current I_meas of the DC motor 200 and the maximum supported current I_max. The inverse PD controller 204 also includes a second circuit 208 that generates a derivative term 'D' that inversely corresponds to the rate of change $$\frac{de2}{dt}$$

of the difference e2 between the measured current I_meas and the maximum supported current I_max.

In FIG. 2, the actual duty cycle (D_cyc') equals the calculated duty cycle D_cyc minus the duty cycle adjustment value D_adj. The inverse PD controller 204 may be designed as follows:

$$\text{For } 0 < e_2 < 5A, \text{D\_cyc} > \text{D\_adj} > 0, \quad (1)$$

$$\text{D\_adj} \propto 1/e_2, \quad (2)$$

$$1/\text{D\_adj} \propto \frac{de_2}{dt}. \quad (3)$$

where equation (2) gives inverse proportionality and equation (3) gives differential proportionality. According to equation (1), the duty cycle adjustment value D_adj varies between zero and the calculated duty cycle D_cyc. Other types of controllers may be used to implement the second control loop 114 of the USB-PD IC controller 104. For example, a more complex control methodology may be used in the case of robot control, laser control, etc.

Figure 3:
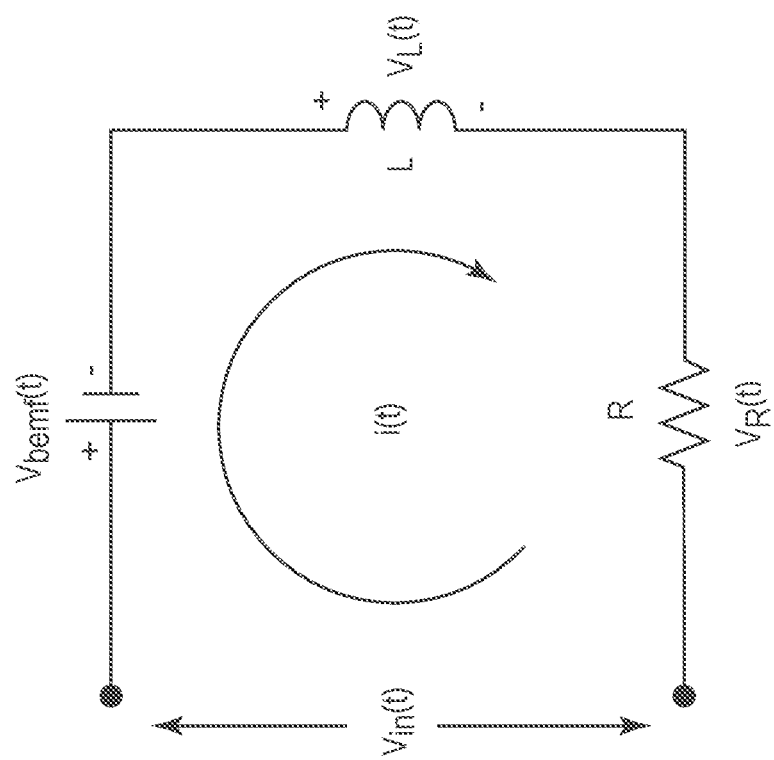
FIG. 3 illustrates a schematic representation of a dynamic model of a BLDC stator and brushed DC armature.

FIG. 3 illustrates a schematic representation of a dynamic model of a BLDC stator and brushed DC armature. The current (i) drawn by the stator phase under consideration depends on the input drive voltage (Vin), the back EMF (Vbemf) due to the rotor velocity (ω), and the impedance (Z=R+j×L) of the circuit. The input drive voltage Vin is controlled by the USB-PD IC controller 104 and can be represented as:

$$V_{in}(t) = v_{bemf}(t) + v_L(t) + v_R(t) \quad (4)$$

where $v_L(t)$ is the voltage due to coil inductance and which can be represented as:

$$v_L(t) = L\frac{di(t)}{dt} \quad (5)$$

and L is the inductance of the stator phase winding.

The stator phase current i(t) can be represented as:

$$i(t) = \frac{1}{L}\int_0^t (V_{in}(t) - v_{bemf}(t) - v_R(t))dt + i(0) \quad (6)$$

Ignoring the negligible voltage drop across pure ohmic winding resistance, $$i(t) = \frac{1}{L}\int_0^t \left(V_{in}(t) - N\frac{d\phi(t)}{dt}\right)dt + i(0) \quad (7)$$

where $$\frac{d\phi(t)}{dt} \propto \omega \quad (8)$$

and ω is rotor angular velocity of the rotor. Therefore, the current drawn by the winding is dependent on the drive voltage and rotor speed.

Figure 4:
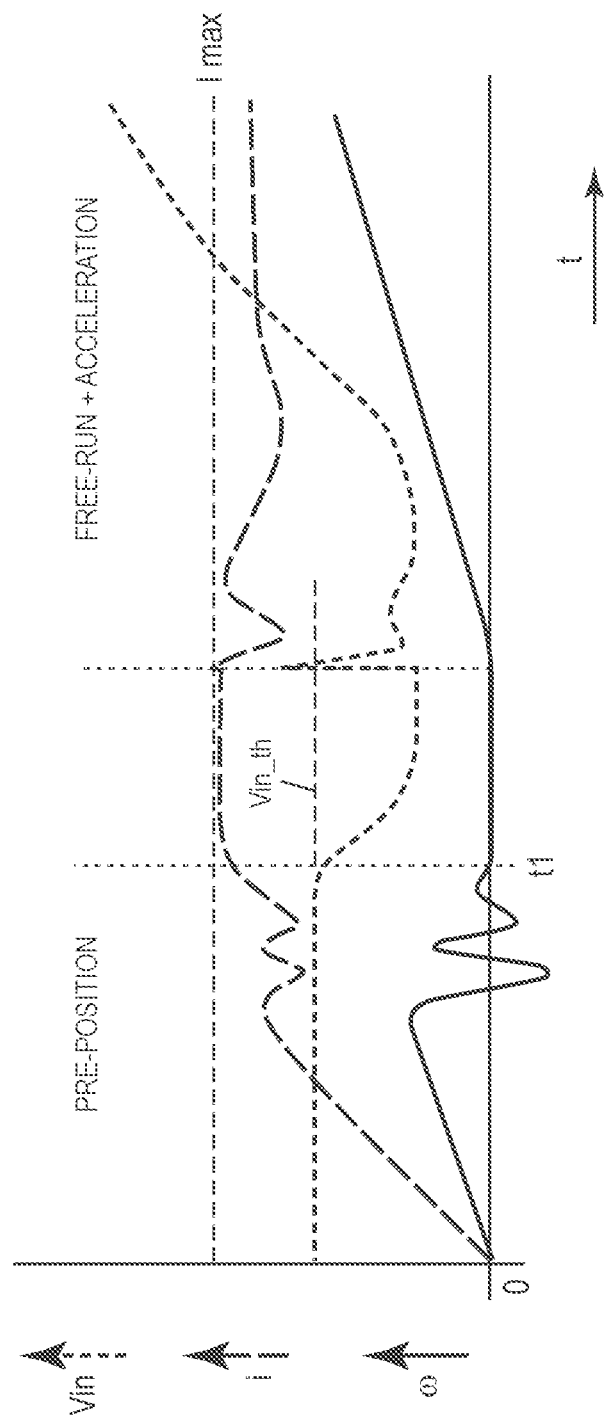
FIG. 4 illustrates DC drive voltage, speed and stator phase current during an open-loop start-up process implemented by the USB-PD IC controller, for a BLDC motor as the dynamic load.

FIG. 4 illustrates the DC drive voltage Vin, speed w and stator phase current i during an open-loop start-up process implemented by the USB-PD IC controller 104, for a BLDC motor 200 as the dynamic load 102. The stator phase current i of the BLDC motor depends on physical and electrical parameters of the DC motor 200. The DC drive voltage Vin controlled by the USB-PD IC controller 104 can be changed to start different types of motors.

As shown in FIG. 4, the open-loop start-up process includes a 'pre-position' phase for sensorless control and during which the USB-PD IC controller 104 causes a small current to be forced through one of the motor phases for a defined amount of time (pre-position duty). The nearest rotor magnetic pole aligns to this phase, making the rotor ready to be accelerated by the USB-PD IC controller 104, in an open loop. Magnetic pole alignment is indicated when the angulator velocity ω of the rotor is zero. FIG. 4 shows the value of ω at zero during the latter part of the 'pre-position' phase, indicating pole alignment. After alignment is achieved, the open-loop start-up process enters a free-running or rotor acceleration phase ('free-run+acceleration') during which the rotor speed increases. When the rotor pole is aligned to the stator, the DC motor is accelerated by the USB-PD IC controller 104 in an open loop to achieve sufficient RPM (rotations per minute) to build the back EMF signal amplitude to a detectable level.

However, before rotor pole alignment is achieved, and without adequate control, the 'pre-position' phase of the open-loop start-up process can result in the stator phase current i exceeding the maximum supported current Imax (e.g., 5A) to be delivered over the USB Type-C cable 108. When the phase current i exceeds the maximum supported current Imax to be delivered over the USB Type-C cable 108, an overcurrent fault condition occurs necessarily and the DC drive voltage Vin is set to 0V which can adversely affect motor control activation.

Figure 5:
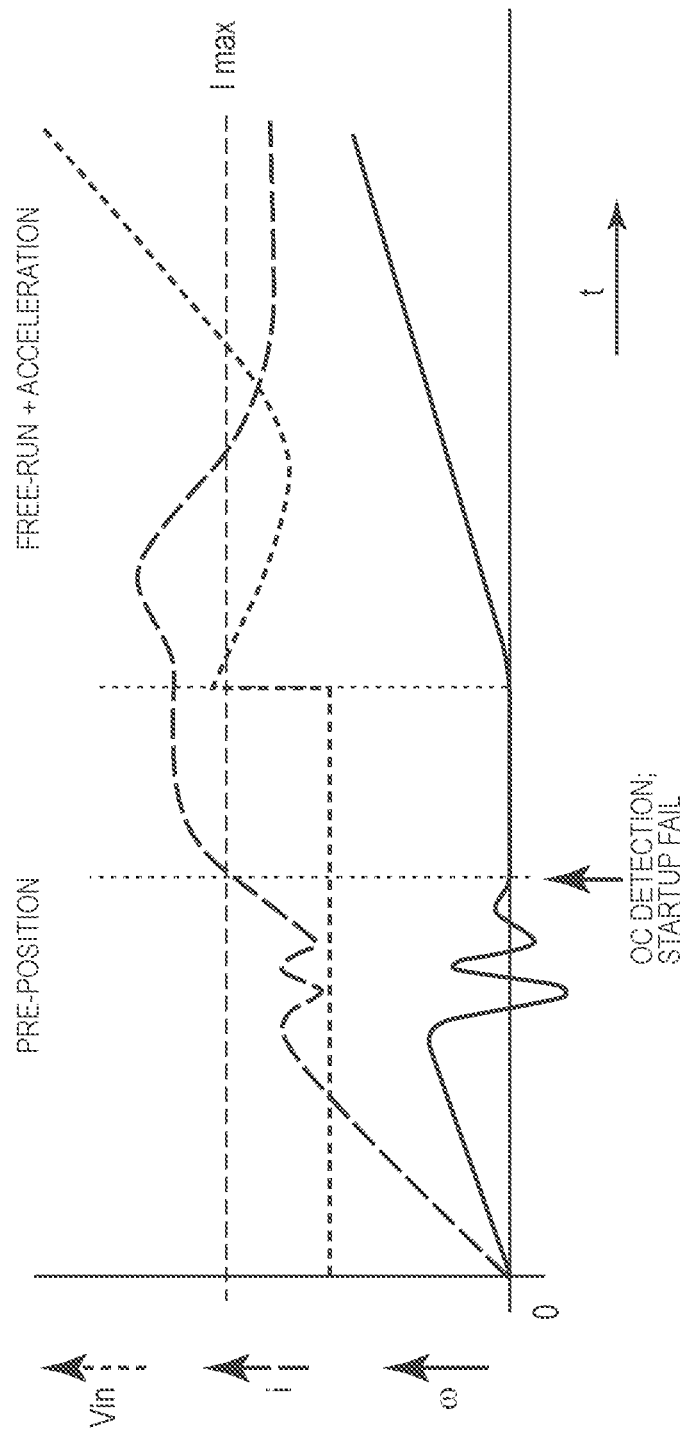
FIG. 5 illustrates the same open-loop start-up process as FIG. 4 but with the stator phase current exceeding the maximum supported current to be delivered over the USB Type-C cable.

FIG. 5 illustrates the same open-loop start-up process as FIG. 4 for the same motor type but with the stator phase current (i) exceeding the maximum supported current Imax to be delivered over the USB Type-C cable 108. This results in detection of an overcurrent (OC) condition and the motor startup process fails using USB-PD in this case.

The second control loop 114 of the USB-PD IC controller 104 reduces the DC drive voltage Vin starting around time t1 in FIG. 4, to avoid the overcurrent (OC) condition shown in FIG. 5. Doing so ensures that the stator phase current i remains below the maximum supported current Imax to be delivered over the USB Type-C cable 108 during the entire 'pre-position' phase of the open-loop start-up process. Also during the open-loop start-up process, the second control loop 114 of the USB-PD IC controller 104 may help to achieve a quick rotor alignment by setting a higher threshold Vin_th for the DC drive voltage Vin which results in higher alignment torque. Even with a high value for the DC drive voltage Vin, the stator phase current i is still limited post alignment during steady state flow through the ohmic resistance (R in FIG. 3).

Figure 6:
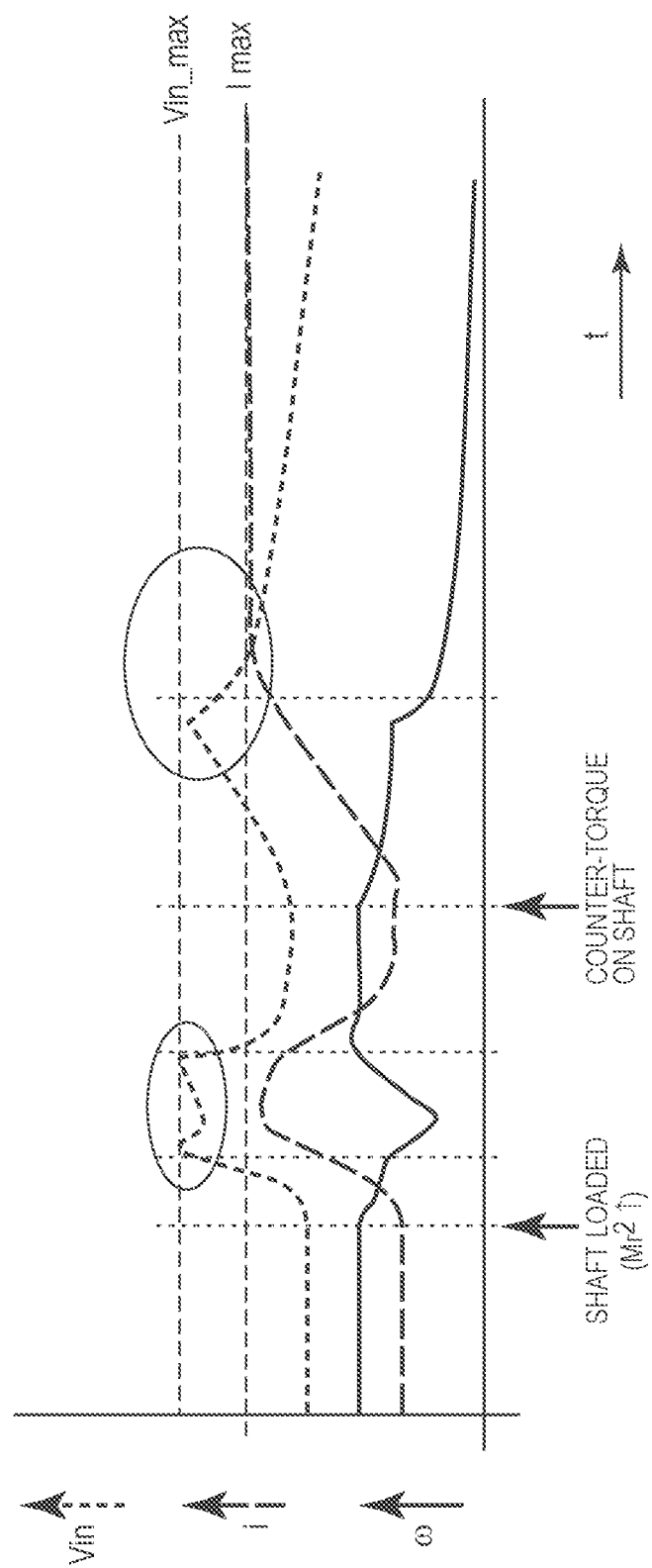
FIG. 6 illustrates DC drive voltage, speed and stator phase current during a closed-loop process implemented by the USB-PD IC controller, for a BLDC motor as the dynamic load.

FIG. 6 illustrates DC drive voltage Vin, speed w and stator phase current i during a closed-loop process implemented by the USB-PD IC controller 104, for a BLDC motor as the dynamic load 102. The USB-PD IC controller 104 implements closed-loop control when the desired level of amplitude and shape of the back EMF is reached, by commutating the phases based on the feedback obtained from the back EMF signal.

Figure 7:
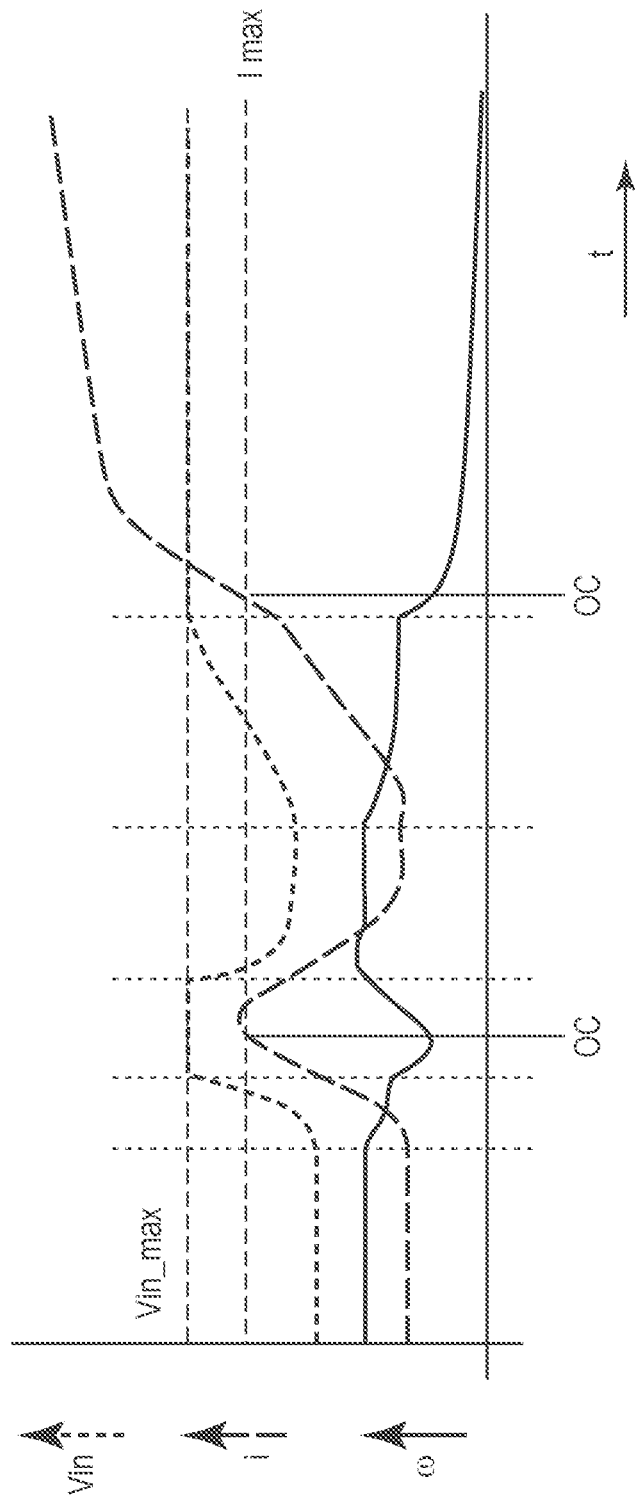
FIG. 7 illustrates the same closed-loop start-up process as FIG. 6 but with the stator phase current exceeding the maximum supported current to be delivered over the USB Type-C cable.

In steady state closed-loop operation, if a mechanical load is applied on the rotor shaft ('shaft loaded' in FIG. 6), the moment of inertia of the rotor increases ($Mr^2$↑ in FIG. 6). Similarly, if the counter-torque on the rotor shaft increases due to external factors, the rotor RPM reduces, naturally. In either of these cases, the USB-PD IC controller 104 attempts to maintain constant velocity by increasing the duty cycle (e.g., PWM duty cycle). However, the duty cycle and the DC drive voltage Vin both have a maximum limit. Beyond the maximum limit, any additional counter-torque reduces the rotor velocity w and therefore the back EMF. This in turn raises the phase current i drawn in steady state. Unless properly mitigated, the phase current i may exceed the maximum supported current to be delivered over the USB Type-C cable 108 which leads to an overcurrent condition ('OC') as shown in FIG. 7 and that results in sudden and expected shut-down.

To avoid this issue, the USB-PD IC controller 104 is configured to reduce the duty cycle D_cyc by the duty cycle adjustment value D_adj such that the DC drive voltage Vin that powers the dynamic load 102 drops below the maximum supported voltage Vin_max, even if the difference between the measured rotor velocity ω_meas and the reference rotor velocity ω_ref widens. The circled regions in FIG. 6 indicate when the USB-PD IC controller 104 reduces D_cyc by D_adj to keep Vin below Vin_max even though the difference between ω_meas and ω_ref widens as indicated by the drop in w in FIG. 6 for each circled region. Reduced motor speed is acceptable in this case, if doing so maintains the phase current i within an acceptable range (i.e., below Imax).

More generally for any type of dynamic load 102, the second control loop 114 of the USB-PD IC controller 104 may increase the duty cycle adjustment value D_adj as the measured current I_meas of the dynamic load 102 increases and/or as the rate of change $$\frac{dI\_meas}{dt}$$

of the measured current I_meas increases. The USB-PD IC controller 104 may reduce the duty cycle D_cyc by the duty cycle adjustment value D_adj such that the DC drive voltage Vin drops below the maximum supported voltage Vin_max during closed-loop control of the dynamic load 102, even if this means the difference between the measured operating parameter (e.g., ω for a DC motor, voltage, etc.) and the reference operating parameter widens.

Figure 8:
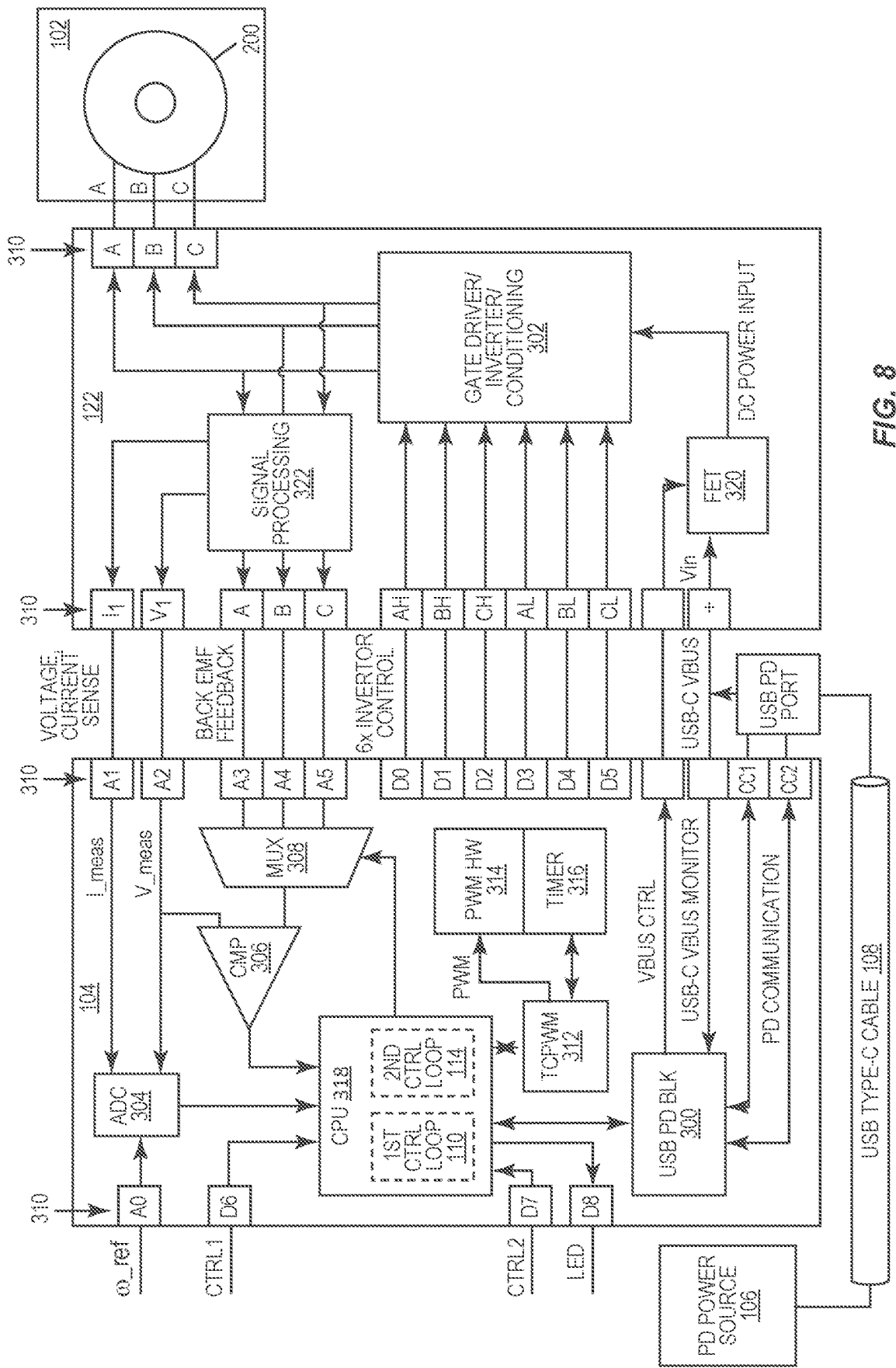
FIG. 8 illustrates a block diagram of the USB-PD IC controller, according to an embodiment.

FIG. 8 illustrates a block diagram of the USB-PD IC controller 104, according to an embodiment. In FIG. 8, the USB-PD IC controller 104 receives USB PD power of up to, e.g., 240 W (e.g., 48V, 5 A) from a standard EPR (extended power range) supported USB PD source 106, through an EPR-capable USB Type-C cable 108. PD communications and contract negotiations are handled by a USB PD block 300 integrated in the USB-PD IC controller 104. The USB-PD IC controller 104 also handles electronic commutation of a connected sensorless BLDC motor 200, using closed-loop speed control based on back EMF feedback sensing. This control may be achieved, e.g., by driving a three-phase MOSFET (metal-oxide-semiconductor field-effect transistor) inverter 302 included in the power circuit 112 connected between the motor 200 and the controller 104. The USB-PD IC controller 104 also handles faults such as overvoltage, overcurrent, and other commutation failures to protect the motor 200 from damage.

A multi-bit successive approximation ADC (analog-to-digital converter) block 304 reads analog signals corresponding to the measured phase voltage V_meas and the measured phase current I_meas. An operational amplifier comparator ('CMP') block 306 detects a back EMF zero-crossing event based on back EMF feedback from the power circuit 112. n analog multiplexer block 308 routes the back EMF feedback and other analog signals from a general purpose interface 310 to the internal analog peripherals, including the operational amplifier comparator block 306. Motor speed ω_meas may be calculated based on the back emf signals.

PWM control blocks 312 and corresponding hardware ('HW') blocks 314 generate PWM control signals to drive the three-phase MOSFET inverter 302 included in the power circuit 112. A counter control timer block 316 is used for multiple firmware functionalities, including commutation timing control. A CPU (central processing unit) 318 includes and/or executes firmware and/or logic blocks to implement the first and second control loops 110, 114 described herein, and controls various internal blocks of the USB-PD IC controller 104 such as the USB PD block 300, the analog multiplexer block 308, and the PWM control blocks 312 based on the feedback provided from the power circuit 112, the reference speed ω_ref and other control input ('CTRL1', 'CTRL2', etc.) provided to the USB-PD IC controller 104. The second control loop 112 adjusts the duty cycle of the PWM control signals generated by the PWM control blocks 312 and corresponding hardware blocks 314 as described herein, to power the dynamic load 102 over the USB Type-C cable 108 with a DC voltage Vin having a magnitude that corresponds to the adjusted duty cycle. The USB-PD IC controller 104 may also have an LED (light emitting diode) or other type of user interface.

The three-phase MOSFET inverter 302 included in the power circuit 112 generates 3-phase signals from a DC source. Upper ('H') MOSFETs of the three-phase MOSFET inverter 302 act as a high-side switch which requires a high-side gate driver. Lower ('L') MOSFETs of the three-phase MOSFET inverter 302 act as a low side switch with a low-side gate driver. The three phase terminals ('A', 'B', and 'C') are derived from source terminals of the upper MOSFETs of the three-phase MOSFET inverter 302. The DC drive voltage Vin is connected to the drain terminals of the upper MOSFETs of the three-phase MOSFET inverter 302. The MOSFETs of the three-phase MOSFET inverter 302 are switched by applying appropriate gate voltages supplied by the respective gate drivers. The upper MOSFETs of the three-phase MOSFET inverter 302 connect the respective phase terminals to the input DC supply voltage (Vin/USB-C VBUS), e.g., via a protection switch device 320 such as a power FET. The lower MOSFETs of the three-phase MOSFET inverter 302 connect the respective phase terminals to ground voltage or other reference potential.

For sensorless control of the BLDC motor 200, sensing back EMF signals is needed as the electronic commutation is directly dependent on the zero-crossing instant of back EMF signals from each of the three phases. Optimal performance of the motor 200 is realized as the CPU 318 can read the zero-crossing events in the back EMF signals with good resolution. However, the back EMF voltages are proportional to the speed of the rotor and may exceed the input voltage range of the USB-PD IC controller 104. Accordingly, the power circuit 112 may include a signal processing circuit 322. The signal processing circuit 322 may include, e.g., a voltage divider that provides a fraction of the back EMF signal voltage as feedback to the USB-PD IC controller 104. Noise can degrade the accuracy in interpreting the zero-crossing events in the signal. Accordingly, the signal processing circuit 322 may include a passive low-pass filter circuit to attenuate high frequency noise out of the system. The signal processing circuit 322 may include one or more circuits for sensing stator phase voltage Vs and stator phase current Is.

Although the present disclosure is not so limited, the following numbered examples demonstrate one or more aspects of the disclosure.

Example 1. An electronic system, comprising: a dynamic load; and a Universal Serial Bus (USB)-Power Delivery (PD) integrated circuit (IC) controller comprising: a first control loop configured to calculate a duty cycle based on a difference between a measured operating parameter of the dynamic load and a reference operating parameter; and a second control loop configured to calculate a duty cycle adjustment value that ensures a maximum supported current to be delivered over a USB Type-C cable to the dynamic load is not exceeded during operation of the dynamic load, wherein the USB-PD IC controller is configured to adjust the duty cycle based on the duty cycle adjustment value, and to power the dynamic load over the USB Type-C cable with a DC voltage having a magnitude that corresponds to the adjusted duty cycle.

Example 2. The electronic system of example 1, wherein the dynamic load is a DC motor, and wherein the USB-PD IC controller is configured to control each phase of the DC motor.

Example 3. The electronic system of example 2, wherein the DC motor is a brushless DC motor.

Example 4. The electronic system of example 2 or 3, wherein the measured operating parameter is measured rotor velocity of the DC motor and the reference operating parameter is a reference rotor velocity, and wherein the second control loop of the USB-PD IC controller is configured to increase the duty cycle adjustment value as a measured current of the DC motor increases and/or as a rate of change of the measured current increases.

Example 5. The electronic system of example 4, wherein the USB-PD IC controller is configured to reduce the duty cycle by the duty cycle adjustment value such that the DC voltage that powers the dynamic load drops below a maximum supported voltage, even if the difference between the measured rotor velocity and the reference rotor velocity widens.

Example 6. The electronic system of any of examples 1 through 5, wherein the second control loop of the USB-PD IC controller comprises: a first circuit configured to generate a proportional term that inversely corresponds to a difference between a measured current of the dynamic load and the maximum supported current; and a second circuit configured to generate a derivative term that inversely corresponds to a rate of change of the difference between the measured current and the maximum supported current.

Example 7. The electronic system of example 6, wherein the dynamic load is a brushless DC motor, wherein the measured current is a measured stator current of the brushless DC motor, and wherein the maximum supported current is 5 A.

Example 8. The electronic system of any of examples 1 through 7, wherein the second control loop of the USB-PD IC controller includes a proportional-derivative (PD) controller for calculating the duty cycle adjustment value, and wherein the first control loop of the USB-PD IC controller includes a proportional-integral (PI) controller or a proportional-integral-derivative (PID) controller for calculating the duty cycle.

Example 9. The electronic system of any of examples 1 through 8, wherein the dynamic load is a brushless DC motor, and wherein the second control loop of the USB-PD IC controller is configured to increase a DC drive voltage threshold during an open-loop start-up of the brushless DC motor.

Example 10. The electronic system of any of examples 1 through 9, wherein the second control loop of the USB-PD IC controller is configured to increase the duty cycle adjustment value as a measured current of the dynamic load increases and/or as a rate of change of the measured current increases, and wherein the USB-PD IC controller is configured to reduce the duty cycle by the duty cycle adjustment value such that the DC voltage that powers the dynamic load drops below a maximum supported voltage during closed-loop control of the dynamic load, even if the difference between the measured operating parameter and the reference operating parameter widens.

Example 11. A Universal Serial Bus (USB)-Power Delivery (PD) integrated circuit (IC) controller, comprising: a first control loop configured to calculate a duty cycle based on a difference between a measured operating parameter of a dynamic load and a reference operating parameter; and a second control loop configured to calculate a duty cycle adjustment value that ensures a maximum supported current to be delivered over a USB Type-C cable to the dynamic load is not exceeded during operation of the dynamic load, wherein the USB-PD IC controller is configured to adjust the duty cycle based on the duty cycle adjustment value, and to power the dynamic load over the USB Type-C cable with a DC voltage having a magnitude that corresponds to the adjusted duty cycle.

Example 12. The USB-PD IC controller of example 11, wherein the dynamic load is a DC motor, and wherein the USB-PD IC controller is configured to control each phase of the DC motor.

Example 13. The USB-PD IC controller of example 12, wherein the DC motor is a brushless DC motor.

Example 14. The USB-PD IC controller of example 12 or 13, wherein the measured operating parameter is measured rotor velocity of the DC motor and the reference operating parameter is a reference rotor velocity, and wherein the second control loop is configured to increase the duty cycle adjustment value as a measured current of the DC motor increases and/or as a rate of change of the measured current increases.

Example 15. The USB-PD IC controller of example 14, wherein the USB-PD IC controller is configured to reduce the duty cycle by the duty cycle adjustment value such that the DC voltage that powers the dynamic load drops below a maximum supported voltage, even if the difference between the measured rotor velocity and the reference rotor velocity widens.

Example 16. The USB-PD IC controller of any of examples 11 through 15, wherein the second control loop comprises: a first circuit configured to generate a proportional term that inversely corresponds to a difference between a measured current of the dynamic load and the maximum supported current; and a second circuit configured to a derivative term that inversely corresponds to a rate of change of the difference between the measured current and the maximum supported current.

Example 17. The USB-PD IC controller of example 16, wherein the dynamic load is a brushless DC motor, wherein the measured current is a measured stator current of the brushless DC motor, and wherein the maximum supported current is 5 A.

Example 18. The USB-PD IC controller of any of examples 11 through 17, wherein the second control loop includes a proportional-derivative (PD) controller for calculating the duty cycle adjustment value, and wherein the first control loop includes a proportional-integral (PI) controller or a proportional-integral-derivative (PID) controller for calculating the duty cycle.

Example 19. The USB-PD IC controller of any of examples 11 through 18, wherein the dynamic load is a brushless DC motor, and wherein the second control loop of the USB-PD IC controller is configured to increase a DC drive voltage threshold during an open-loop start-up of the brushless DC motor.

Example 20. The USB-PD IC controller of any of examples 11 through 19, wherein the second control loop is configured to increase the duty cycle adjustment value as a measured current of the dynamic load increases and/or as a rate of change of the measured current increases, and wherein the USB-PD IC controller is configured to reduce the duty cycle by the duty cycle adjustment value such that the DC voltage that powers the dynamic load drops below a maximum supported voltage during closed-loop control of the dynamic load, even if the difference between the measured operating parameter and the reference operating parameter widens.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electronic system, comprising:
   a dynamic load; and
   a Universal Serial Bus (USB)-Power Delivery (PD) integrated circuit (IC) controller comprising:
      a first control loop configured to calculate a duty cycle based on a difference between a measured operating parameter of the dynamic load and a reference operating parameter; and
      a second control loop configured to calculate a duty cycle adjustment value that ensures a maximum supported current to be delivered over a USB Type-C cable to the dynamic load is not exceeded during operation of the dynamic load,
   wherein the USB-PD IC controller is configured to adjust the duty cycle based on the duty cycle adjustment value, and to power the dynamic load over the USB Type-C cable with a DC voltage having a magnitude that corresponds to the adjusted duty cycle.

2. The electronic system of claim 1, wherein the dynamic load is a DC motor, and wherein the USB-PD IC controller is configured to control each phase of the DC motor.

3. The electronic system of claim 2, wherein the DC motor is a brushless DC motor.

4. The electronic system of claim 2, wherein the measured operating parameter is measured rotor velocity of the DC motor and the reference operating parameter is a reference rotor velocity, and wherein the second control loop of the USB-PD IC controller is configured to increase the duty cycle adjustment value as a measured current of the DC motor increases and/or as a rate of change of the measured current increases.

5. The electronic system of claim 4, wherein the USB-PD IC controller is configured to reduce the duty cycle by the duty cycle adjustment value such that the DC voltage that powers the dynamic load drops below a maximum supported voltage, even if the difference between the measured rotor velocity and the reference rotor velocity widens.

6. The electronic system of claim 1, wherein the second control loop of the USB-PD IC controller comprises:
   a first circuit configured to generate a proportional term that inversely corresponds to a difference between a measured current of the dynamic load and the maximum supported current; and
   a second circuit configured to generate a derivative term that inversely corresponds to a rate of change of the difference between the measured current and the maximum supported current.

7. The electronic system of claim 6, wherein the dynamic load is a brushless DC motor, wherein the measured current is a measured stator current of the brushless DC motor, and wherein the maximum supported current is 5 A.

8. The electronic system of claim 1, wherein the second control loop of the USB-PD IC controller includes a proportional-derivative (PD) controller for calculating the duty cycle adjustment value, and wherein the first control loop of the USB-PD IC controller includes a proportional-integral (PI) controller or a proportional-integral-derivative (PID) controller for calculating the duty cycle.

9. The electronic system of claim 1, wherein the dynamic load is a brushless DC motor, and wherein the second control loop of the USB-PD IC controller is configured to increase a DC drive voltage threshold during an open-loop start-up of the brushless DC motor.

10. The electronic system of claim 1, wherein the second control loop of the USB-PD IC controller is configured to increase the duty cycle adjustment value as a measured current of the dynamic load increases and/or as a rate of change of the measured current increases, and wherein the USB-PD IC controller is configured to reduce the duty cycle by the duty cycle adjustment value such that the DC voltage that powers the dynamic load drops below a maximum supported voltage during closed-loop control of the dynamic load, even if the difference between the measured operating parameter and the reference operating parameter widens.

11. A Universal Serial Bus (USB)-Power Delivery (PD) integrated circuit (IC) controller, comprising:
    a first control loop configured to calculate a duty cycle based on a difference between a measured operating parameter of a dynamic load and a reference operating parameter; and
    a second control loop configured to calculate a duty cycle adjustment value that ensures a maximum supported current to be delivered over a USB Type-C cable to the dynamic load is not exceeded during operation of the dynamic load,
    wherein the USB-PD IC controller is configured to adjust the duty cycle based on the duty cycle adjustment value, and to power the dynamic load over the USB Type-C cable with a DC voltage having a magnitude that corresponds to the adjusted duty cycle.

12. The USB-PD IC controller of claim 11, wherein the dynamic load is a DC motor, and wherein the USB-PD IC controller is configured to control each phase of the DC motor.

13. The USB-PD IC controller of claim 12, wherein the DC motor is a brushless DC motor.

14. The USB-PD IC controller of claim 12, wherein the measured operating parameter is measured rotor velocity of the DC motor and the reference operating parameter is a reference rotor velocity, and wherein the second control loop is configured to increase the duty cycle adjustment value as a measured current of the DC motor increases and/or as a rate of change of the measured current increases.

15. The USB-PD IC controller of claim 14, wherein the USB-PD IC controller is configured to reduce the duty cycle by the duty cycle adjustment value such that the DC voltage that powers the dynamic load drops below a maximum supported voltage, even if the difference between the measured rotor velocity and the reference rotor velocity widens.

16. The USB-PD IC controller of claim 11, wherein the second control loop comprises:
   a first circuit configured to generate a proportional term that inversely corresponds to a difference between a measured current of the dynamic load and the maximum supported current; and
   a second circuit configured to a derivative term that inversely corresponds to a rate of change of the difference between the measured current and the maximum supported current.

17. The USB-PD IC controller of claim 16, wherein the dynamic load is a brushless DC motor, wherein the measured current is a measured stator current of the brushless DC motor, and wherein the maximum supported current is 5 A.

18. The USB-PD IC controller of claim 11, wherein the second control loop includes a proportional-derivative (PD) controller for calculating the duty cycle adjustment value, and wherein the first control loop includes a proportional-integral (PI) controller or a proportional-integral-derivative (PID) controller for calculating the duty cycle.

19. The USB-PD IC controller of claim 11, wherein the dynamic load is a brushless DC motor, and wherein the second control loop of the USB-PD IC controller is configured to increase a DC drive voltage threshold during an open-loop start-up of the brushless DC motor.

20. The USB-PD IC controller of claim 11, wherein the second control loop is configured to increase the duty cycle adjustment value as a measured current of the dynamic load increases and/or as a rate of change of the measured current increases, and wherein the USB-PD IC controller is configured to reduce the duty cycle by the duty cycle adjustment value such that the DC voltage that powers the dynamic load drops below a maximum supported voltage during closed-loop control of the dynamic load, even if the difference between the measured operating parameter and the reference operating parameter widens.

* * * * *